United States Patent
Bugosh

[19]

[11] Patent Number: 6,141,864
[45] Date of Patent: *Nov. 7, 2000

[54] MOTOR STATOR WINDING TOOL

[75] Inventor: Mark J. Bugosh, Sterling Heights, Mich.

[73] Assignee: TRW Inc., Lyndhurst, Ohio

[*] Notice: This patent issued on a continued prosecution application filed under 37 CFR 1.53(d), and is subject to the twenty year patent term provisions of 35 U.S.C. 154(a)(2).

[21] Appl. No.: 09/007,749

[22] Filed: Jan. 15, 1998

[51] Int. Cl.$^7$ .................................................. H02K 15/00
[52] U.S. Cl. ............................................... 29/732; 29/596
[58] Field of Search ............................. 29/596, 732, 736

[56] References Cited

U.S. PATENT DOCUMENTS

| | | |
|---|---|---|
| 3,163,921 | 1/1965 | Applegate . |
| 3,395,449 | 8/1968 | Moore . |
| 3,815,207 | 6/1974 | Habegger . |
| 3,895,423 | 7/1975 | Arakelov et al. ..................... 29/205 D |
| 4,276,689 | 7/1981 | Urick et al. ................................ 29/596 |
| 4,540,906 | 9/1985 | Blom .................................... 310/67 R |
| 4,719,948 | 1/1988 | Tsugawa ................................ 140/92.1 |
| 4,750,258 | 6/1988 | Anderson .................................. 29/596 |
| 5,213,275 | 5/1993 | Giesy .......................................... 242/1 |
| 5,454,156 | 10/1995 | Morr .......................................... 29/596 |
| 5,535,503 | 7/1996 | Newman . |
| 5,598,625 | 2/1997 | Bluen et al. ............................... 29/594 |
| 5,814,776 | 9/1998 | Worley .................................. 200/38 R |

*Primary Examiner*—Carl E. Hall
*Attorney, Agent, or Firm*—Tarolli, Sundheim, Covell, Tummino & Szabo L.L.P.

[57] ABSTRACT

A winding tool (10) is used for connecting pairs of motor stator winding leads (91b–98b, 91c–98c) and cutting of the connected pairs of leads to a predetermined length. The winding tool (10) includes a first part (100) received in the rotor space (88) in the motor stator (12) and a second part (102) projecting from a first end portion (72) of the motor stator. The first part (100) of the winding tool (10) has a cylindrical outer surface (116) engageable in an interference fit with a cylindrical inner surface (86) of the motor stator core (80) to resist radial and axial movement of the winding tool relative to the motor stator (12). The winding tool (10) has a plurality of slots (131–138) spaced circumferentially about an axis (30) and extending along an outer surface (126) of the second part (102) of the winding tool (10). The number of slots (131–138) is equal to the number of magnetic poles of the motor stator (12). The slots (131–138) have an axial length approximately equal to the predetermined length of the connected pairs of leads (91b–98b, 91c–98c).

5 Claims, 4 Drawing Sheets

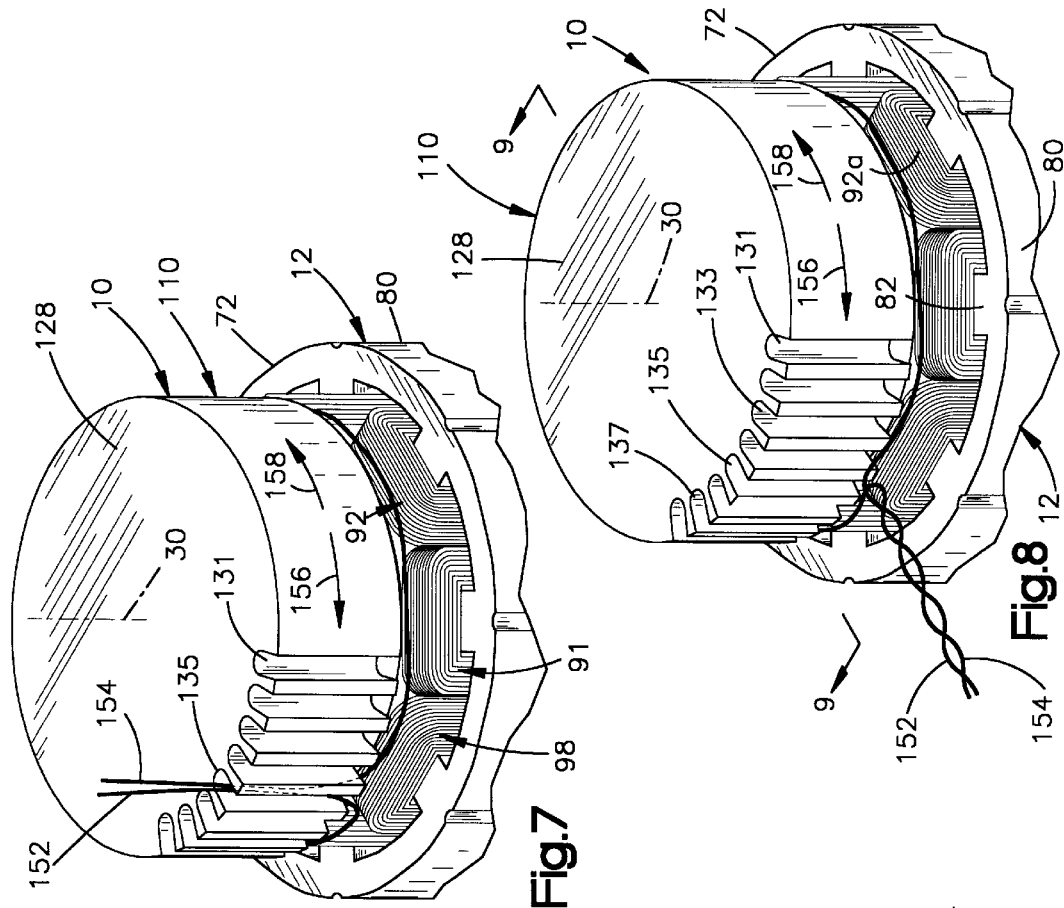
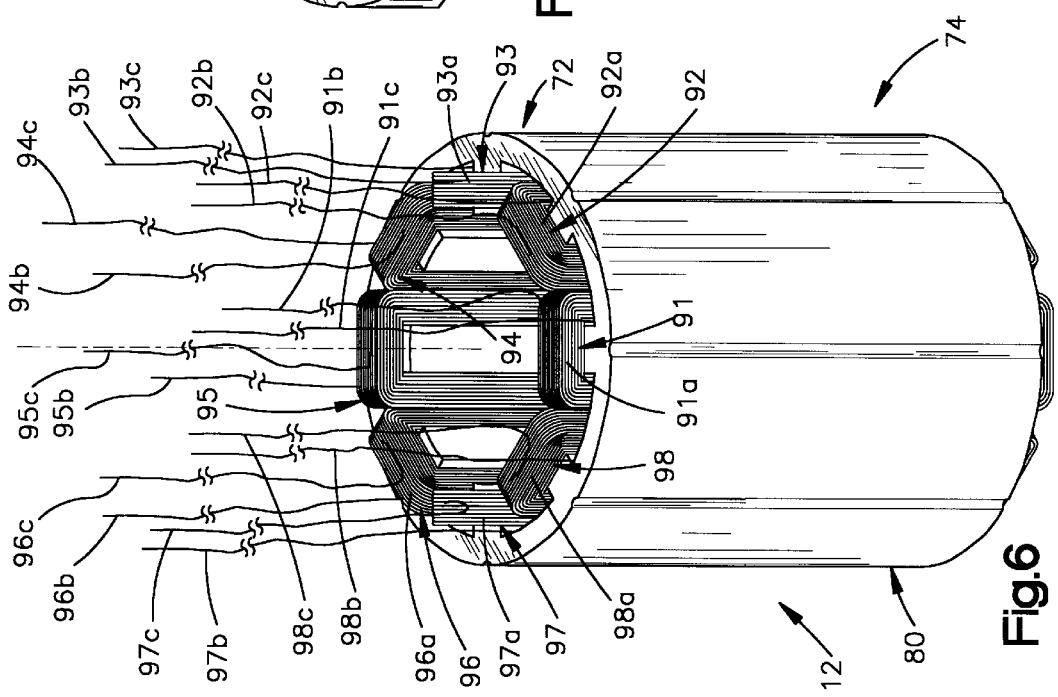

MOTOR STATOR WINDING TOOL

BACKGROUND OF THE INVENTION

1. Technical Field

The present invention relates to a winding tool for use in winding a stator of an electric motor. In particular, the present invention relates to a winding tool for use in winding a stator of an electric motor used in an electric power assist steering system for a vehicle.

2. Description of the Prior Art

A known type of vehicle steering system includes a rack which is movable linearly to effect turning movement of the steerable wheels of the vehicle. Movement of the rack is assisted by an electric assist motor. The motor has a stator and a rotor. The rack extends axially through the rotor. Actuation of the motor causes the rotor to rotate a ball nut which is engaged with a screw portion of the rack. The rotation of the ball nut causes the rack to move linearly to effect turning movement of the steerable wheels of the vehicle.

The stator includes a metal core and a plurality of windings (coils) on the metal core. During manufacture of the stator, the lead wires which are the ends of the windings must be selectively connected in pairs, cut to the correct length, and routed properly for connection with electric circuitry of the vehicle. This task is typically done by hand and can be difficult and time-consuming with a multiple-pole motor.

SUMMARY OF THE INVENTION

The present invention is an assembly comprising a motor stator having an axis and a generally cylindrical configuration centered on the axis. The motor stator has first and second axially opposite end portions. The motor stator includes a cylindrical metal core having a cylindrical inner surface centered on the axis and defining a cylindrical rotor space in the motor stator. The motor stator includes a plurality of windings on the core between the first and second end portions of the core and spaced equally about the axis to define magnetic poles of the motor stator. Each one of the motor stator windings has two leads extending from the first end portion of the motor stator. Each one of the leads is electrically connected with a lead from another one of the windings to form a pair of leads of a predetermined length for connection with electric circuitry for energizing the motor stator. The assembly also comprises a winding tool for assisting in connecting pairs of the motor stator winding leads and cutting of the connected pairs of leads to the predetermined length. The winding tool includes a first part received in the rotor space in the motor stator and a second part projecting from the first end portion of the motor stator. The first part of the winding tool has a cylindrical outer surface engageable in an interference fit with the cylindrical inner surface of the motor stator core to resist radial and axial movement of the winding tool relative to the motor stator. The winding tool has a plurality of slots spaced circumferentially about the axis and extending along an outer surface of the second part of the winding tool. The number of the slots is equal to the number of magnetic poles of the motor stator. The slots have an axial length approximately equal to the predetermined length of the connected pairs of leads.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 6 is a perspective view of the motor stator of FIG. 1;

FIG. 7 is a perspective view showing the winding tool of FIG. 2 being used in manufacture of the motor stator of FIG. 6;

FIG. 8 is a view similar to FIG. 7 showing a further step in the manufacture of the motor stator of FIG. 6;

DESCRIPTION OF A PREFERRED EMBODIMENT

Figure 1:
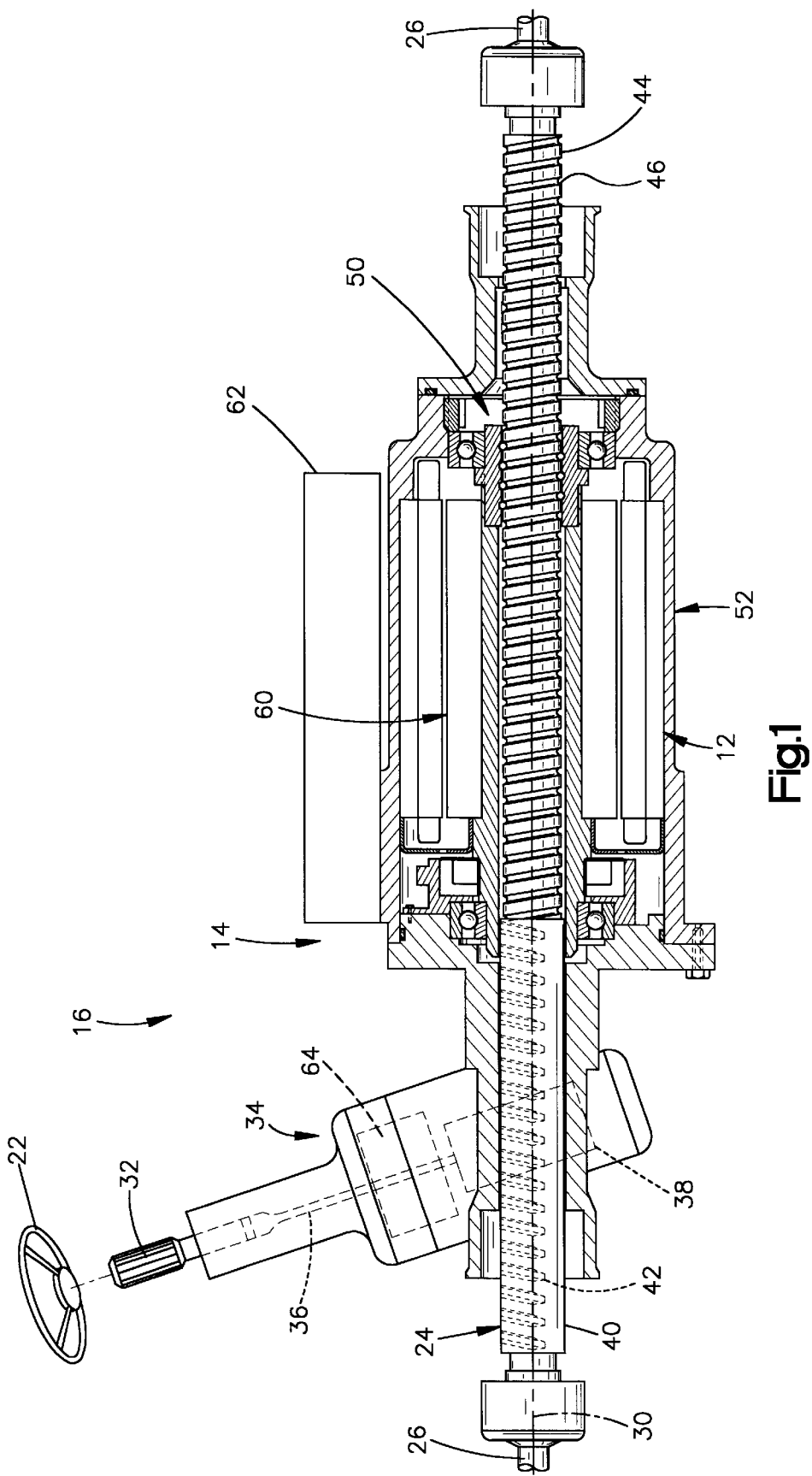
FIG. 1 is a view, partially in section, of a steering system including a motor stator constructed in accordance with the present invention.
Figures 2, 3:
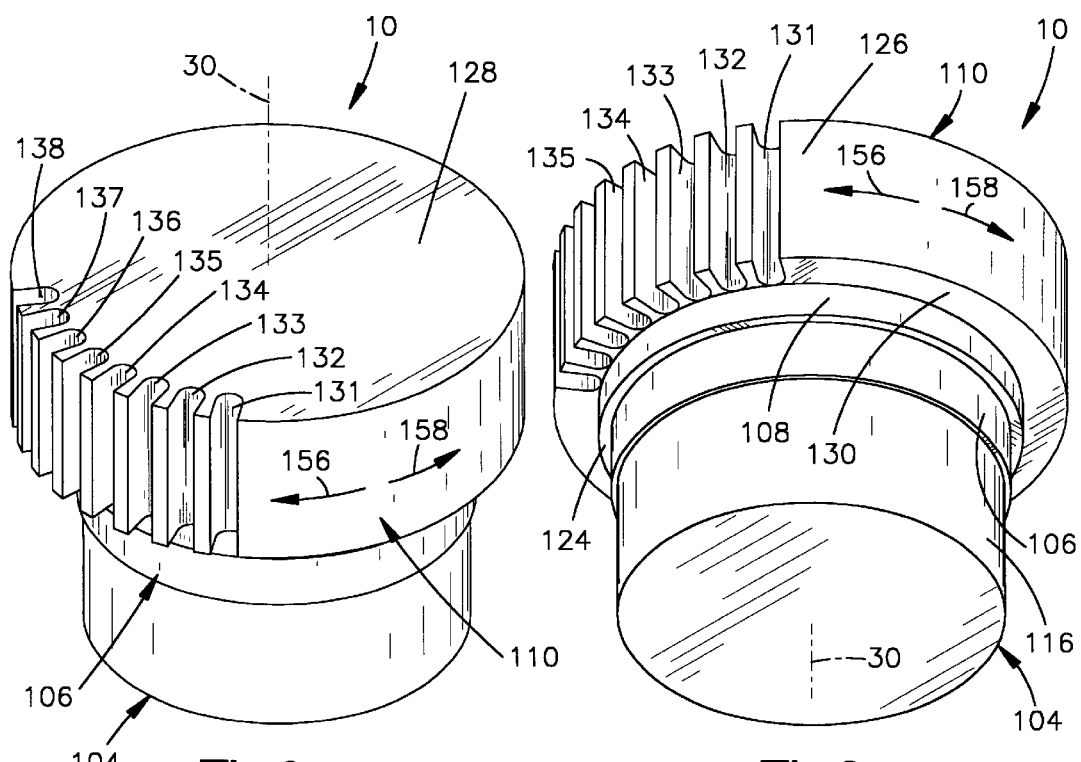
FIG. 2 is a top perspective view of a winding tool for use in manufacture of the motor stator of FIG. 1.
FIG. 3 is a bottom perspective view of the winding tool of FIG. 2.

The present invention relates to a tool for use in the manufacture of an electric motor. In particular, the present invention relates to a winding tool for assisting in connecting pairs of motor stator winding leads and cutting of the connected pairs of leads to a predetermined length.

As representative of the present invention, FIGS. 2–5 illustrate a winding tool 10 for use in winding the motor stator 12 (FIGS. 1 and 6–10) of a motor 14 which forms part of a vehicle power assist steering system 16.

The steering system 16 (FIG. 1) includes a driver-operated steering wheel 22 operatively connected to a rack or steering member 24. The steering member 24 is coupled with the steerable wheels (not shown) of a vehicle through tie rods 26. The steering member 24 extends along an axis 30 of the steering system 16.

The vehicle steering wheel 22 is connected for rotation with an input shaft 32 which extends into a pinion housing 34. The input shaft 32 is mechanically coupled by a torsion bar 36, in a known manner, to a pinion gear 38 located in the pinion housing 34.

The steering member 24 includes a first portion 40 having rack teeth 42 disposed thereon and a second portion 44 having an external screw thread convolution 46 axially spaced from the rack teeth. The rack teeth 42 on the steering member 24 are in meshing engagement with gear teeth (not shown) on the pinion gear 38.

The motor 14 includes a motor tube 52 which houses the other components of the motor. The stator 12 is press fit inside the motor tube 52. The stator 12 is energizable by an electric current over lead wires (not shown in FIG. 1) to generate a magnetic field for effecting operation of the motor 50.

The motor 14 also includes a rotor 60. An ECU (electronic control unit) indicated schematically at 62 is fastened to the motor 14. The stator 12 and a torque sensor 64 are electrically connected to the ECU 62.

Upon rotation of the vehicle steering wheel 22 by the driver of the vehicle, vehicle electric circuitry, including the ECU 62 and the torque sensor 64, determines whether the motor 14 should be operated to provide steering assist to move the steering member 24. If the motor 14 is operated, the rotor 60 is caused to rotate about the axis 30 relative to the stator 12. A ball nut assembly 50 rotates with the rotor 60. Because the ball nut assembly 50 is fixed in position axially, the steering member 24 is driven to move axially in response, effecting steering movement of the steerable wheels of the vehicle as desired.

The stator 12 (FIGS. 6 and 9–10) has a generally cylindrical configuration centered on the axis 30. The stator 12 has first and second axially opposite end portions 72 and 74.

The stator 12 (FIG. 6) includes a metal core 80. The core 80 is preferably made from a plurality of stacked laminations (not shown) which are laser welded together to form the core. The core 80 has a plurality of ribs 82 which project radially inward toward the axis 30. Each one of the ribs 82 has an inner surface 84 which is formed as a part of a cylinder centered on the axis 30. The inner surfaces 84 of the ribs 82 together form a cylindrical inner surface 86 of the stator 12.

The inner surface 86 of the stator 12 defines a cylindrical rotor space 88 (FIGS. 9 and 10) of the motor 14. The rotor 60 is disposed within and rotates within the rotor space 88. No portion of the stator 12 extends into the rotor space 88.

A plurality of windings 91–98 (FIG. 6) are disposed on the core 80. The windings 91–98 define magnetic poles of the motor stator 12. End portions 91a–98a of the windings 91–98 project axially a small distance from the end of the core 80, at the first end portion 72 of the stator 12. The end portions 91a–98a of the windings 9198 are spaced radially outward from the inner surface 86 of the stator 12. The rotor space 88 extends for the entire length of the stator 12, including the space radially inward of the winding end portions 91a–98a.

Each one of the stator windings 91–98 has two leads 91b–98b and 91c–98c extending from the first end portion 72 of the motor stator 12. Each one of the leads 91b–98b and 91c–98c is typically a plurality of conductors, for example, three conductors. In the illustrated embodiment, each one of the leads 91b–98b and 91c–98c, is for clarity, shown as a single wire or conductor.

The winding tool 10 (FIGS. 2–5) has a solid, generally cylindrical configuration and is shaped as a plug which fits into the end of the stator 12. The winding tool 10 is preferably molded as one piece from a material, such as ABS plastic, which is soft enough to avoid damaging the varnish (insulation) on the windings 91–98 and on the stator core 80.

Figures 4, 5:
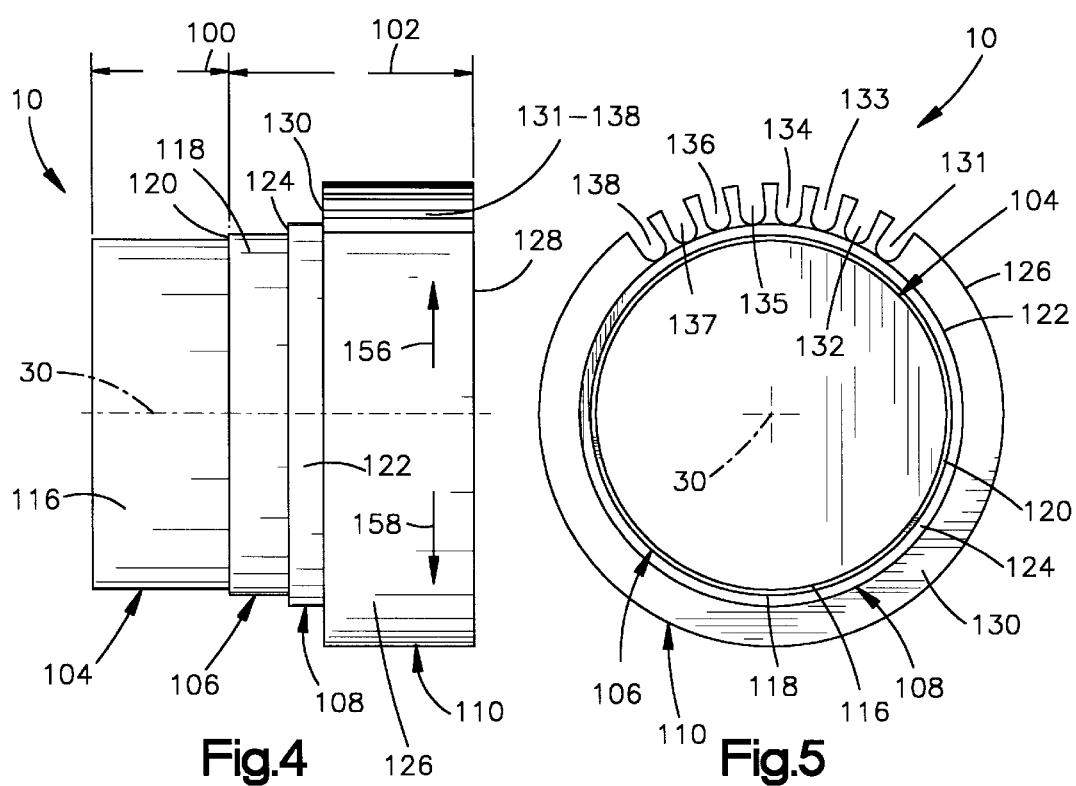
FIG. 4 is a side elevational view of the winding tool of FIG. 2.
FIG. 5 is a bottom plan view of the winding tool of FIG. 2.
Figure 9:
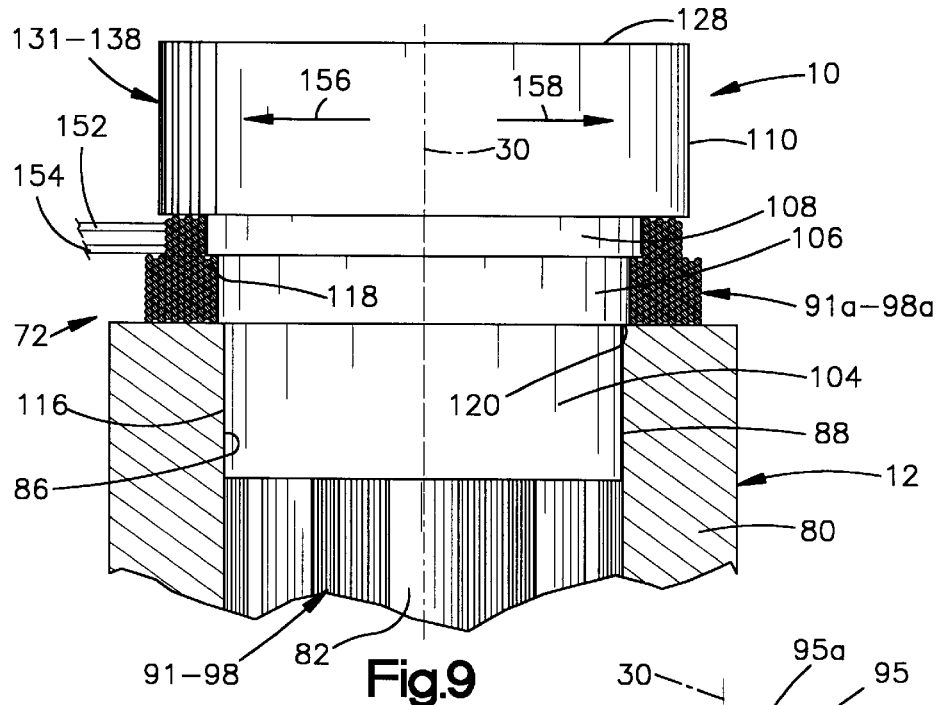
FIG. 9 is a sectional view taken generally along line 9—9 of FIG. 8.
Figure 10:
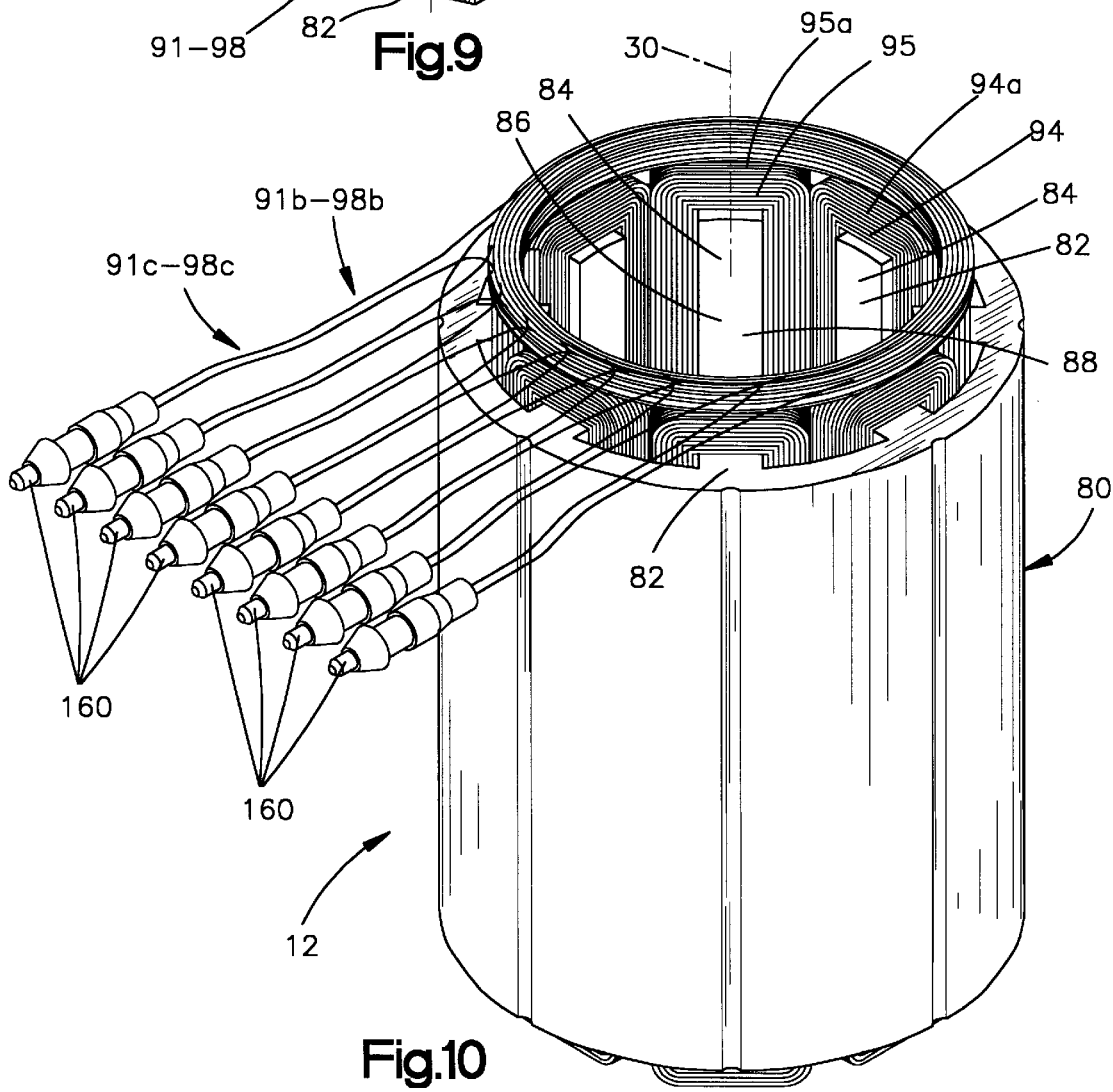
FIG. 10 is a view similar to FIG. 6 showing the motor stator in a completed condition.

The winding tool 10 has first and second parts 100 and 102 (FIG. 4). The first part 100 of the winding tool 10 includes a cylindrical first portion 104 of the tool. The second part 102 of the winding tool 10 includes cylindrical second, third and fourth portions 106, 108 and 110 of the winding tool.

The first portion 104 of the winding tool 10 has a cylindrical outer surface 116 centered on the axis 30. The second portion 106 of the winding tool 10 has a greater diameter than the first portion 104 of the winding tool. An annular shoulder surface 120 extends radially between the outer surface 116 of the first portion 104 and the outer surface 118 of the second portion 106 of the winding tool 10.

The third portion 108 of the winding tool 10 has a cylindrical outer surface 122 centered on the axis 30. The diameter of the third portion 108 of the winding tool 10 is greater than the diameter of the second portion 106 of the tool. An annular shoulder surface 124 extends radially between the outer surface 118 of the second portion 106 of the winding tool 10 and the outer surface 122 of the third portion 108 of the winding tool.

The fourth portion 110 of the winding tool 10 has a cylindrical outer surface 126 centered on the axis 30 and a circular, radially extending end surface 128. The diameter of the fourth portion 110 of the winding tool 10 is substantially greater than the diameter of the third portion 108 of the winding tool. An annular shoulder surface 130 extends radially between the outer surface 122 of the third portion 108 and the outer surface 126 of the fourth portion 110 of the tool 10.

A plurality of slots 131–138 are formed in the fourth portion 110 of the tool 10. The slots 131–138 are spaced circumferentially about the axis 30 and extend axially along the outer surface 126 of the fourth portion 110 of the winding tool 10, between the shoulder surface 130 and the end surface 128. The slots 131–138 occupy about one-fourth of the circumference of the fourth portion 110 of the winding tool 10. The number of slots 131–138 is equal to the number of magnetic poles of the motor stator 12. The slots 131–138, and the fourth portion 110 of the winding tool 10, have an axial length approximately equal to the predetermined desired length of the connected pairs of leads 91b–98b and 91c–98c.

To connect the leads 91b–98b and 91c–98c of the stator 12, the winding tool 10 is inserted axially into the first end portion 72 of the stator. Specifically, the first portion 104 of the winding tool 10 is inserted into the rotor space 88. The diameter of the first portion 104 of the winding tool 10 is selected to provide an interference fit between the cylindrical outer surface 116 of the first tool portion 104 and the cylindrical inner surface 86 of the stator 12. This interference fit prevents relative movement between the winding tool 10 and the stator 12 during the lead connection process.

The shoulder surface 120 between the first and second portions 104 and 106 of the winding tool 10 engages the axial end of the core 80 radially inward of the end portions 91a–98a of the windings 91–98. This engagement limits inward movement of the winding tool 10 into the rotor space 88.

The diameter of the second portion 106 of the winding tool is selected so that the second portion fits radially inward of the projecting end portions 91a–98a of the windings. The second portion 106 of the winding tool 10 helps to prevent the leads 91b–98b and 91c–98c from extending into the rotor space 88 during the assembly process. The length of the second portion 106 of the winding tool 10 is selected so that the shoulder surface 118 between the second and third portions 106 and 108 of the winding tool engages the end portions 91a–98a of the windings 91–98.

The fourth portion 110 of the winding tool 10 projects axially from the shoulder surface 124 between the third and fourth winding tool portions 108 and 110. The length and diameter of the fourth portion 110 of the winding tool 10 are selected to provide a desired, predetermined length of the connected pairs of leads 91b–98b and 91c–98c, dependent on the configuration of the particular stator 12 being constructed.

A pair of leads to be connected together, from different ones of the windings 91–98, are selected from the group of leads 91b–98b and 91c–98c. In FIGS. 7 and 8, the exemplary selected leads are numbered 152 and 154. The fourth portion 110 of the winding tool has directional arrows 156 and 158 which indicate the appropriate direction of winding for each one of the leads. The two selected leads 152 and 154 are wound around the third portion 108 of the winding tool 10, in the appropriate direction as indicated by the arrows 156 and 158 on the fourth portion 110 of the winding tool.

The two leads 152 and 154 are then pulled into the appropriate slot 131–138. Each one of the slots 131–138 is labeled, in a manner not shown, for receipt of a particular pair of leads 91b–98b and 91c–98c so that the pairs of leads are in a certain order.

The two leads 152 and 154 are pulled from the third portion 108 of the winding tool 10 up into the appropriate slot 131–138 in the fourth portion 110 of the winding tool, until the ends of the leads project past the circular end surface 128 of the fourth portion of the tool. The exemplary leads 152 and 154 are shown in FIG. 7 as having been pulled into the slot 135.

The two leads 152 and 154 are then cut off at the end surface 128 of the winding tool. The length of the fourth portion 110 of the winding tool 10, which determines the length of the slots 131–138, is selected to provide cut leads of a desired, predetermined length.

The two leads 152 and 154 are then pulled out of the slot 134. The ends of the leads 152 and 154 are stripped of insulation and twisted together. An identifying label (not shown) may then be put on the connected pair of leads 152 and 154.

This procedure is repeated for all the other pairs of leads 91b–98b and 91c–98c of the stator 12. After all eight pairs of leads has been connected in this manner, the winding tool 10 is removed from the stator 12. Electrical connectors 160 (FIG. 10) may then be soldered on the connected pairs of leads 91b–98b and 91c–98c.

At this point, the stator 12 is in a condition in which it can be assembled into the motor tube 52. The eight pairs of leads 91b–98b and 91c–98c are routed out of the motor 14 and connected with the ECU 62 in a manner not shown. The motor 14 is actuatable by the ECU 62 in a known manner.

The winding tool 10 advantageously provides for easy routing of the wire leads 91b–98b and 91c–98c. The paired leads 91b–98b and 91c–98c as completed (FIG. 9) are the correct length and are correctly positioned in a tight, compact package for assembly with the other parts of the motor 14 and the steering system 10.

From the above description of the invention, those skilled in the art will perceive improvements, changes and modifications in the invention. Such improvements, changes and modifications within the skill of the art are intended to be covered by the appended claims.

Having described the invention, I claim:

1. A winding tool for use with a motor stator;

said motor stator having an axis and a generally cylindrical configuration centered on the axis, said motor stator having first and second axially opposite end portions, said motor stator comprising a cylindrical metal core having a cylindrical inner surface centered on the axis and defining a cylindrical rotor space in said motor stator, said motor stator comprising a plurality of windings on the core between the first and second end portions of the core and spaced equally about the axis to define magnetic poles of said motor stator, each one of said motor stator windings having two leads extending from the first end portion of said motor stator, each one of the leads being electrically and mechanically connectable with a lead from another one of the windings to form a connected pair of leads of a predetermined length for connection with electric circuitry for energizing said motor stator;

said winding tool for assisting in connecting pairs of said motor stator winding leads to form connected pairs of the leads and in cutting of the connected pairs of leads to the predetermined length;

said winding tool including a first part received in the rotor space in said motor stator and a second part projecting from the first end portion of said motor stator;

said first part of said winding tool having a cylindrical outer surface engageable in an interference fit with the cylindrical inner surface of said motor stator core to resist radial and axial movement of said winding tool relative to said motor stator;

said winding tool having a plurality of slots spaced circumferentially about the axis and extending along an outer surface of said second part of said winding tool and terminating at an end surface of said winding tool, the number of said slots being equal to the number of magnetic poles of said motor stator, said slots having an axial length approximately equal to the predetermined length of connected pairs of leads, a first pair of the leads prior to electrical and mechanical interconnection with each other being received in a selected one of said slots and extending along the length of said one slot to enable cutting of the first pair of leads to the predetermined length at said end surface of said winding tool.

2. A winding tool as set forth in claim 1 wherein said first part of said winding tool includes a cylindrical first portion of said tool having a first diameter, and said second part of said winding tool includes cylindrical second, third and fourth portions of said tool having increasingly larger diameters than said first portion of said winding tool;

said tool having a first shoulder surface between said first and second portions of said winding tool for engagement with said stator core to limit axial movement of said winding tool relative to said stator core;

the windings having axial end portions and said tool having a second shoulder surface between said second and third portions of said winding tool which engages the end portions of the windings.

3. A winding tool as set forth in claim 2 wherein the diameter of said second portion of said winding tool is selected so that said second portion fits inside the projecting end portions of the windings.

4. A winding tool as set forth in claim 2 wherein the length and diameter of said fourth portion of said winding tool are selected to provide a predetermined length for the connected pairs of leads.

5. A winding tool as set forth in claim 2 wherein each one of said slots is adapted to receive a particular pair of leads from said stator coils so that the pairs of leads are in a certain order.

* * * * *